Figure 1:
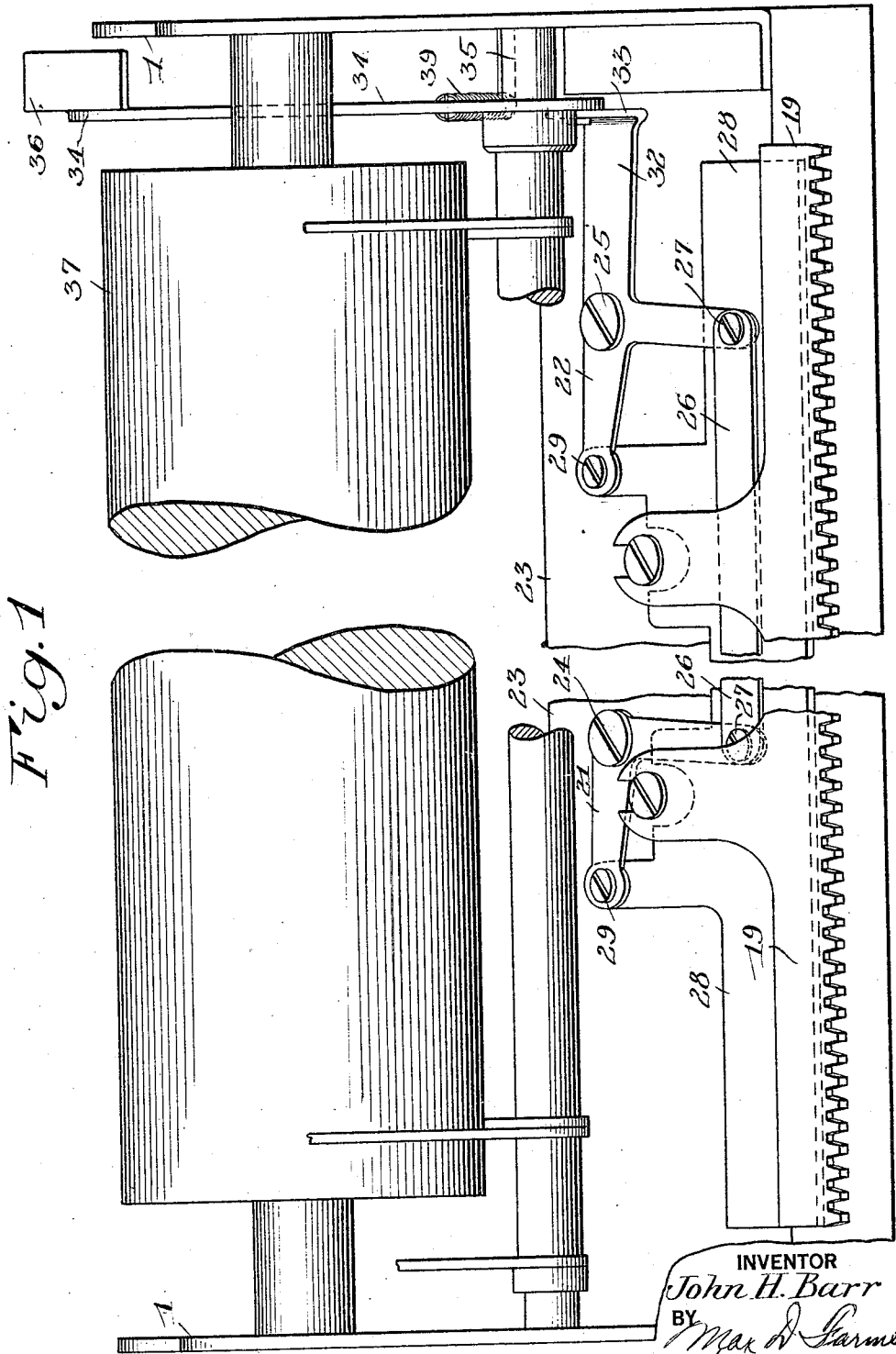

Jan. 8, 1929.

J. H. BARR 1,697,899

TYPEWRITER

Filed Oct. 13, 1926    2 Sheets-Sheet 1

INVENTOR
John H. Barr
BY
Max D. Farmer
his ATTORNEY

Jan. 8, 1929.
J. H. BARR
TYPEWRITER
Filed Oct. 13, 1926
1,697,899
2 Sheets-Sheet 2
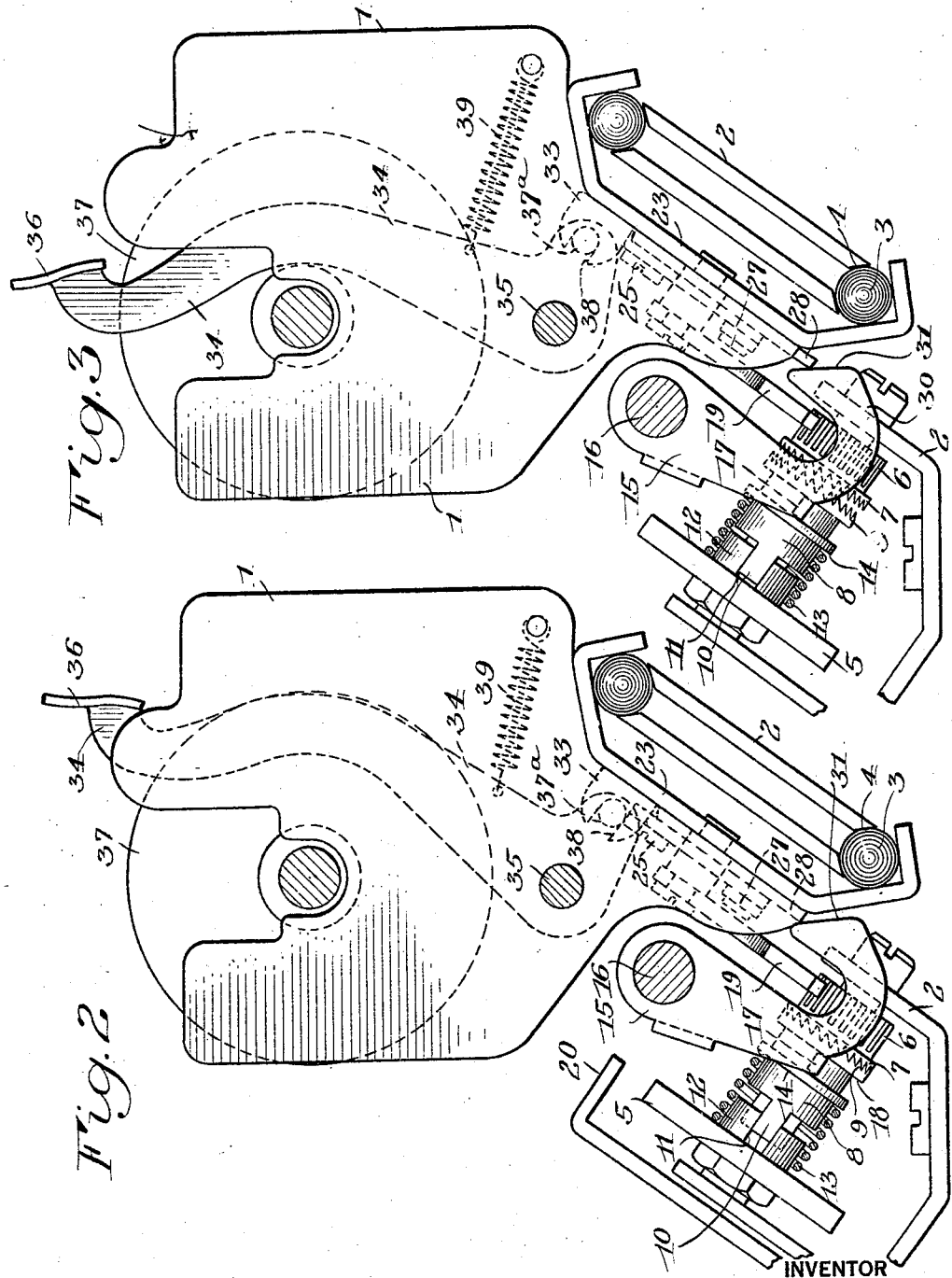
INVENTOR
John H. Barr
BY Max H. Farmer
his ATTORNEY Patented Jan. 8, 1929.

1,697,899

UNITED STATES PATENT OFFICE.

JOHN H. BARR, OF ITHACA, NEW YORK, ASSIGNOR TO BARR-MORSE CORPORATION, A CORPORATION OF NEW YORK.

TYPEWRITER.

Application filed October 13, 1926. Serial No. 141,390.

This invention relates to typewriters and particularly to carriage release mechanism therefor.

An object of the invention is to provide an improved typewriter in which the carriage may be released from or restored to the control of the escapement device in a simple and convenient manner at any point in its travel, and which will be exceptionally simple, practical, compact, durable, dependable and inexpensive. Various other objects and advantages will be apparent from the following description of an embodiment of the invention, and the novel features will be particularly pointed out hereinafter in connection with the appended claims.

In the accompanying drawings:—

Fig. 1 is an oblique plan of a portion of a typewriter illustrating part of the carriage release mechanism, which is carried by the carriage;

Fig. 2 is a sectional side elevation of a portion of the typewriter, and illustrating carriage control mechanism constructed in accordance with this invention, the parts being in the position in which the carriage is controlled by the escapement; and Fig. 3 is a similar elevation but with the parts in the position which they occupy when the carriage has been released from the control of the escapement device.

In the illustrated embodiment of the invention, the carriage 1 is mounted for travel upon a suitable base 2 in any suitable manner, such as through ball bearings 3, which operate between the carriage and trackways 4 of the carriage base. An escapement wheel 5 and pinion 6 are mounted upon a shaft extending from the base 2, the pinion 6 and the escapement wheel 5 being rotatable independently of one another about the axis of the shaft. The face of the pinion 6 towards the escapement wheel is provided with clutch teeth 7, and a suitable clutch element 8 which is slidable on the shaft of the escapement wheel is provided upon its face towards the pinion 6 with clutch teeth 9 which cooperate with the clutch teeth 7 to form a driving connection between the clutch element and the pinion. A tail 10 on the shiftable clutch element 8 is slidingly received in a groove 11 extending endwise in a hub 12 of the escapement wheel, so that the shiftable clutch element 8 will be coupled to the escapement wheel for rotation therewith while sliding into and out of clutched engagement with the pinion 16. A helical compression spring 13 surrounds the hub 12 of the escapement wheel and a part of the shiftable clutch element 8, and also abuts at one end against the escapement wheel and at its other end against a shoulder 14 on the shiftable clutch element. A lever 15 is mounted for oscillation on a rod or shaft 16 of the base, and is provided with one or more ears or tongues 17 which extend into an annular groove 18 provided in the peripheral surface of the shiftable clutch element 8, so that when the lever 15 is oscillated, it will shift the clutch element 8 into or out of clutched engagement with the pinion 6.

A rack 19 is carried by and extends along the carriage and meshes with the pinion 6, so that when the pinion 6 is clutched to the escapement wheel 5, the travel of the carriage will be under the control of the escapement wheel. The escapement wheel of course will be controlled by a suitable escapement element 20, the details of which are not per se a part of the present invention. Bell crank levers 21 and 22 are mounted upon an oblique plate 23 of the carriage, by means of pivot screws 24 and 25, the axes of the pivot screws extending transversely of the travel of the carriage. Two corresponding arms of the bell cranks 21 and 22 are connected by a link 26 and pivot screws 27, so that the two bell cranks will operate in unison. A bar 28 is slidingly confined against the inclined plate 23 of the carriage, and is pivotally connected by screws 29 to the other arms of the bell cranks 21 and 22, so that when the bell cranks are oscillated, the bar 28, which extends lengthwise of the carriage, will be shifted laterally of the direction of travel of the carriage equal amounts along its entire length. The lever 15 is provided with a rearwardly extending hooked end 30, which terminates in an oblique cam edge 31 adjacent and in front of the forward edge of the bar 28, so that when the bell cranks 21 and 22 are oscillated, the forward edge of the bar 28 will engage against the cam edge 31 and shift the clutch lever 15 against the action of the spring 13 and in a direction to uncouple the clutch element 8 from the pinion 6.

One of the bell cranks, such as 22, is provided with a third arm 32 which terminates in an angular end 33 adjacent one end of the carriage. A lever 34 is pivoted at 35 upon one of the carriage rods for movement in a plane transverse to the travel of the carriage, this lever terminating at its upper end in a finger piece 36 adjacent one end of the platen 37. The other end of the lever 34 extends into proximity to the ear or angular end 33 of the bell crank 22 and has a pin and slot connection therewith. For this purpose the lever 34 may carry a pin 37$^a$ which runs in a slot 38 in the free end of the angular end or ear 33 of the bell crank 22, so that when the lever 34 is rocked, it will rock the bell crank 22, and the latter in conjunction with the other bell crank will shift the bar 28 in a direction to disconnect the clutch drive from the escapement wheel to the pinion, or to release the same. A spring 39 connects the lever 34 to a suitable part of the machine, such as the frame or margin rack bail, to return the lever 34 to normal position. When the lever 34 is released, the spring 13 will shift the clutch element 8 into driving relation with the pinion 6 and return the lever 15 into normal position, and the spring 39 will return the lever 34 and the bar 28 to normal positions.

In the use of a typewriter having such a carriage release mechanism, the parts will be in the normal position shown in Fig. 2, with the carriage coupled to the escapement wheel through the pinion 6 and clutch element 8. The carriage will thus have a step by step movement under the control of the escapement wheel, and the elements 20 associated therewith. If one desires to release the carriage from the escapement wheel, such as to quickly shift the carriage from one point of its travel to another, one merely shifts the lever 34 forwardly, and the pin 37$^a$ will act through the bell crank 22, the link 26, and the bell crank 21 to shift the bar 28 in a manner to operate the clutch lever 15 and interrupt the driving connection between the escapement wheel and the pinion 6. While the parts are in this condition as shown in Fig. 3, the carriage may be shifted freely in either direction, and immediately upon the release of the lever 34, the parts will return automatically to the relative positions shown in Fig. 2, with the carriage again under the control of the escapement wheel.

It will be obvious that various changes in the details which have been herein described and illustrated in order to explain the invention may be made by those skilled in the art within the principle and scope of the invention as expressed in the appended claims.

I claim as my invention:—

1. In a typewriter, a carriage, a pair of bell cranks mounted on said carriage, a link connecting arms of said bell cranks to cause their movement in unison, a control bar connected to free arms of said bell cranks, whereby said bar will have a movement in a direction transversely of the travel of the carriage, an escapement device connected to said carriage permitting control of the movements of the carriage by said escapement device, means operable by the movement of said bar in one direction for interrupting the control of the carriage by the escapement device, and a lever carried by the carriage and having connection to one of said bell cranks for operating the same.

2. In a typewriter, a traveling carriage, an escapement device relatively to which the carriage travels, a pinion, a clutch device connecting said pinion to the escapement device and having a movable element by whose movement coupled and uncoupled conditions may be produced, a rack carried by the carriage and meshing with said pinion, whereby the travel of the carriage will be controlled by said escapement device, a lever connected to and operating said movable element, to release the carriage from the control of the escapement device and having a cam surface oblique to the direction of movement of said device, spring means normally urging said movable element into coupled position, a member mounted on said carriage and extending lengthwise of the same and operable in a direction transverse to the direction of movement of said element and against said cam surface at any point in the travel of the carriage, and means carried by said carriage and connected to said carriage mounted member for operating through it the movable element of said clutch device to release the carriage from the control of the escapement device.

3. In a typewriter, a carriage, a base, an escapement device, a pinion, clutch means connecting the escapement device and pinion, whereby the travel of the carriage will be controlled by the escapement device, said clutch means being spring pressed into clutched condition, and cooperating cam connected members carried by the carriage and base and operable to operate said clutch to release the carriage from the control of the escapement device at all points in the travel of the carriage.

4. In a typewriter, a carriage, a rack connected with the carriage for travel therewith, a pinion meshing with said rack, an escapement device, means including a clutch connecting said escapement device and pinion, and spring pressed into a condition in which it couples the carriage with the escapement device for control therefrom, a clutch operating member having a cam surface, a bar extending along the carriage, and means for mounting said bar on the carriage for movement edgewise to engage said cam surface and operate said clutch into unclutched condition at all points in the travel of the carriage.

5. In a typewriter, a carriage, a pair of bell cranks mounted on said carriage, a link connecting arms of said bell cranks to cause their movement in unison, a control bar connected to free arms of said bell cranks, whereby said bar will have a movement in a direction transversely of the travel of the carriage, an escapement device connected to said carriage permitting control of the movements of the carriage by said escapement device, and means operable by the movement of said bar in one direction for interrupting the control of the carriage by the escapement device.

6. In a typewriter, a carriage, a pair of bell cranks mounted on said carriage, a link connecting arms of said bell cranks to cause their movement in unison, a control bar connected to free arms of said bell cranks, whereby said bar will have a movement in a direction transversely of the travel of the carriage, an escapement device connected to said carriage permitting control of the movements of the carriage by said escapement device, means operable by the movement of said bar in one direction for interrupting the control of the carriage by the escapement device, and a lever carried by the carriage and having a pin and slot connection to one of said bell cranks for operating the same.

7. In a typewriter, a carriage, a pair of bell cranks spaced along the length of the carriage for movements about axes transverse to the direction of travel of the carriage, means connecting these bell cranks to cause their operation in unison, a bar extending along the carriage and pivotally connected to said bell cranks for movement in a direction transversely of the travel of the carriage, one of said bell cranks having an operating arm, a lever mounted on the carriage for movement in a plane transversely to the travel of the carriage and having a pin and slot connection to the bell crank operating arm, means including an escapement device for controlling the travel of the carriage, and means operable by transverse movement of said bar to permit movement of the carriage independently of the escapement device.

8. In a typewriter, a traveling carriage, an escapement device, a pinion, clutch means connecting the pinion and escapement device, a rack carried by the carriage and meshing with said pinion, whereby the travel of the carriage will be controlled by said escapement device, an operating lever for said clutch having a cam surface, a bar mounted on and extending along said carriage and movable transversely to the travel of the carriage against said cam surface in a direction different from the movement of said cam surface with said lever to operate the clutch into a condition in which it releases the carriage from the control of the escapement device, and means on the carriage for operating said bar.

JOHN H. BARR.